United States Patent
Dziesietnik

(10) Patent No.: US 11,052,677 B2
(45) Date of Patent: Jul. 6, 2021

(54) MANUFACTURING GARMENTS AND TEXTILES WITH PRINTED PATTERNS THEREON

(71) Applicant: ELECTRONICS FOR IMAGING, INC., Fremont, CA (US)

(72) Inventor: Ghilad Dziesietnik, Fremont, CA (US)

(73) Assignee: ELECTRONICS FOR IMAGING, INC., Fremont, CA (US)

( * ) Notice: Subject to any disclaimer, the term of this patent is extended or adjusted under 35 U.S.C. 154(b) by 0 days.

(21) Appl. No.: 16/392,514

(22) Filed: Apr. 23, 2019

(65) Prior Publication Data

US 2020/0094579 A1    Mar. 26, 2020

Related U.S. Application Data

(60) Provisional application No. 62/736,385, filed on Sep. 25, 2018.

(51) Int. Cl.
*B41J 2/00* (2006.01)
*B41J 3/407* (2006.01)

(52) U.S. Cl.
CPC .................................. *B41J 3/4078* (2013.01)

(58) Field of Classification Search
None
See application file for complete search history.

(56) References Cited

U.S. PATENT DOCUMENTS

| | | | |
|---|---|---|---|
| 6,173,211 B1* | 1/2001 | Williams | A41H 3/08 700/131 |
| 6,435,117 B2 | 8/2002 | Codos et al. | |
| 7,201,397 B2* | 4/2007 | Keshavaraj | B60R 21/235 112/475.08 |
| 7,895,091 B2 | 2/2011 | Hegemier et al. | |
| 9,623,578 B1 | 4/2017 | Aminpour et al. | |
| 2014/0277683 A1* | 9/2014 | Gupta | A41H 3/007 700/132 |
| 2016/0347085 A1 | 12/2016 | Cloots et al. | |

* cited by examiner

*Primary Examiner* — Erica S Lin
*Assistant Examiner* — Tracey M McMillion
(74) *Attorney, Agent, or Firm* — Perkins Coie LLP; Colin M. Fowler

(57) ABSTRACT

Disclosed herein is a technique that improves material efficiency in generating garments and textiles that include graphics. A given product is sorted into cut patterns used to assemble the product. Graphics are digitally applied to each cut pattern in order to generate abstract cut patterns including aligned graphics. Blank cut patterns are nested across a virtual sheet of fabric in a 2D space without any consideration to the graphics. The nested cut patterns implement the abstract cut patterns that include graphics. The graphics are aligned to the positions of the cut patterns according to the nesting scheme. Print instructions including nested cut patterns with aligned graphics are delivered to a printer that executes the print job. The cut patterns are cut away from the fabric sheet including graphic designs that are aligned with the cut patterns.

18 Claims, 7 Drawing Sheets

MANUFACTURING GARMENTS AND TEXTILES WITH PRINTED PATTERNS THEREON

CROSS-REFERENCE TO RELATED APPLICATIONS

This application claims the benefit of U.S. provisional patent application Ser. No. 62/736,385 filed Sep. 25, 2018, which is incorporated herein in its entirety by this reference thereto.

TECHNICAL FIELD

The present disclosure relates to a system for providing garments with printed patterns thereon, and, more particularly, the present disclosure relates to a system for providing garments with printed patterns thereon that includes optimized nesting of garment portions.

BACKGROUND

In prior art processes for providing garments with printed patterns thereon, textile sheets and rolls are preprinted with designs and graphics, and then placed on cutting tables to be used for nesting and cutting design patterns, which are later sewn into a final textiles consumable, for example, garments, bedding, etc. In this method, there is a waste in printing because there is no prior knowledge as to what the specific fabric elements' geometries are and how they match the prints. Also, prior art processes mandate specific nesting of the fabric pattern elements to the textile texture print to match the required print design, which results in poor cutting yields due to high levels of constraints between the pattern geometries and the textile sheet print.

DETAILED DESCRIPTION OF THE PREFERRED EMBODIMENTS

Figure 1A:
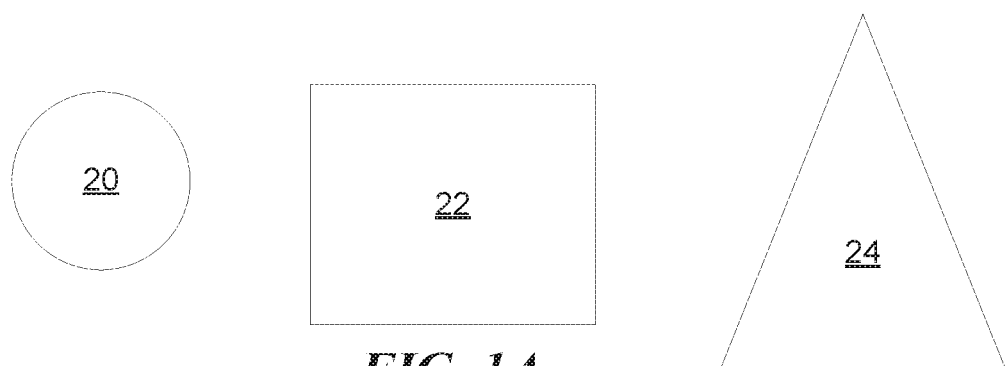
FIG. 1A illustrates an example of arbitrarily chosen cut patterns of a garment or textile.

The following description and drawings are illustrative and are not to be construed as limiting. Numerous specific details are described to provide a thorough understanding of the disclosure. However, in certain instances, well-known or conventional details are not described in order to avoid obscuring the description. References to one or another embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. Appearances of the phrase "in one embodiment" in various places in the specification do not necessarily refer to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Some uses of terms used in this document are taken or derived from PDLs (Page Description Languages) common in the graphic art industry and intended for printing. Examples are PDF, PostScript, PCL, and IPDS.

Mask is a repeatable graphic shape, most commonly in a rectangular shape. The content of the mask or pattern can be described by any graphic language and can be expressed as a simple color image or a combination of complex synthetic graphics (line, shapes, gradations). In the context of fabric designs, the pattern is a reorientation of a basic design and repeatable elements described with design tools like EFI applications of Adobe design applications.

TM is the transformation matrix stating the necessary information for setting the right starting point and steps necessary to place the specific pattern assigned to a specific clip-path.

Applying different clip-paths or shapes on the fabric associated with a specific pattern allows for the implementation of dynamic, real time Variable Data Printing by rendering the shapes to the body layer by the DFE (Digital Front End) connected to the press.

The execution of the function generating the body layer can be done offline, for example in the EFI Optitex application that generates the marker for fabric generation or as mentioned above in real time during the print process.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," and "below" used herein are merely for ease of description and refer to the orientation of the components as shown in the figures. It should be understood that any orientation of the components described herein is within the scope of the present invention.

Embodiments of this disclosure concern a method that couples effective nesting of fabric as part of the textile cutting process with direct printing designs on the nested elements instead of the entire textile sheet.

Embodiments herein address the waste in redundant printing because the teachings in this disclosure not only use a blank textile roll to start with, but also print only in the pattern's geometry areas. Embodiments herein also increase fabric yield because there are no constraints between the pattern geometries and the textile sheet print.

Fabric Design Creation

A design pattern is defined using graphic design tools, such as, for example, Adobe Photoshop or Adobe Illustrator. A basic design pattern, which can be repeated on the fabric to create a continuous design, is defined. Colorways are defined as well. The printing is deferred to a later stage, as described below.

Garment Creation

Garments with graphics are initially printed on uncut sheets of material. Prior art printing processes that operate on uncut sheets of material (e.g., applying graphics before the garment is constructed) print indiscriminately on the uncut sheets. Indiscriminate printing wastes ink. Ink is wasted because ink is applied to portions of material that will become scraps. Additionally, indiscriminate printing either wastes material or limits the graphic orientation. The trade-off of material efficiency or graphic orientation is a result of either applying an efficient nesting pattern for garment segments without reference to graphic orientation (thus graphics are rotated in all directions), or cutting the garment segments as aligned with the graphic pattern (thus significant portions of material become scrap).

Described herein is a technique to first develop a nesting pattern for cut patterns of the garments with reference to the material, then generate a set of print instructions that include a graphic oriented to each cut pattern. When printing, the printer executes the specific print instructions with one-to-one oriented graphic prints associated with each cut pattern of garments.

A design of the garment is created using graphic design tools, such as, for example, Adobe Photoshop or Adobe Illustrator. The design is converted to a technical design using 2D/3D CAD systems such as Optitex as marketed by EFI. The output of the design process is a set of cut and sew patterns (garment segments). The position of the design basic block/step is aligned properly to each cut pattern with the correct rotation/scaling or any other geometrical transformation.

Nesting (i.e., the positioning of the cut pattern) is performed as if for a "white" fabric, without any consideration to the graphic design pattern. The nesting is configured to prioritize density to minimize fabric waste. The nesting process may be performed using, for example, the Optitex CAD system.

The nesting layout, which includes the positioning of the cut patterns and the association of each cut pattern to the graphic design block, is sent to the digital front end (DFE) as a PDF or PS file. The DFE executes the PDF or PS file, resulting in print instructions which print each cut pattern with the appropriate graphics per the nesting layout.

Printing Process

In an exemplary embodiment, a PDF, PS, or any other graphic language describes the execution script with the following pseudo commands describing the layout:

```
Graphic design basic repeat block
W,H
Graphic elements (images, text, lines, shapes...)
Cut pattern descriptions
Cut pattern 1:
Graphic description of the shape
Description of the relationship to the graphic basic
repeat
Cut pattern 2:
....
Bounding box of the nested repeat: X,Y, Width, Height
(relative to the fabric)
Repeats: (across the width of the fabric)
Length (how many meters to print, which represent also
the repeats in the height direction):
For the bounding box add:
Cut pattern 1: X,Y, relative to the bounding box
Cut pattern 2: ....
....
```

This print description language file is sent to the DFE/RIP (raster image processing) for processing and generation of the print data sent to the printing press.

FIG. 1A illustrates an example of arbitrarily chosen cut patterns of a garment or textile. Garments or textiles include one or more cut patterns that are later assembled to build a final product. For example, a shirt generally includes "a back," "a front" and two "sleeve" cut patterns that combine to make the shirt. Many other garments and textiles are built that make use of any number of geometric shapes. For purposes of this disclosure, three geometric shapes are chosen arbitrarily to use as an example a first cut pattern (Circle) 20, a second cut pattern (square) 22, and a third cut pattern (triangle) 24.

Figure 1B:
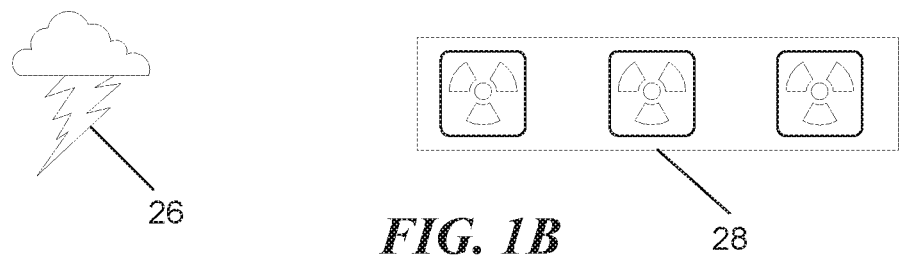
FIG. 1B illustrates an example of a graphic design and a repeating template of a basic element graphic design that are included on a final garment or textile.

FIG. 1B illustrates an example of a graphic design and a repeating template of a basic element graphic design that are included on a final garment or textile. Graphics may be applied as single elements 26, or as repeating templates 28.

Figure 1C:
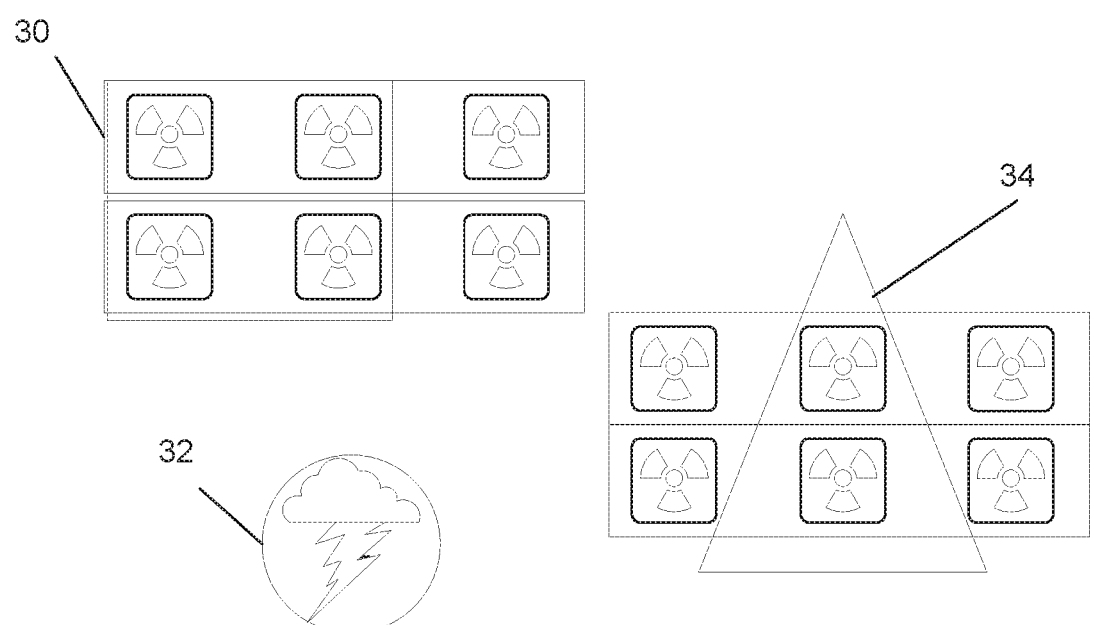
FIG. 1C illustrates positioning of the graphic designs oriented to respective cut patterns.

FIG. 1C illustrates positioning the graphic designs oriented to respective cut patterns. Through the user interface, users apply graphics to cut patterns in a designed orientation. Application of graphics to cut patterns creates abstract cut patterns. The cut patterns are abstract in the sense that they do not represent a specific cut pattern that will be printed to a sheet of physical fabric, but rather a non-implemented version that the system can nest into a virtual fabric.

Abstract cut pattern 30 includes the second cut pattern (the square) 22 with two repeating graphic templates 28 positioned as desired. A portion of the graphic template 28 hangs off of the cut pattern. In some embodiments, the portions of the graphics that exist beyond the edge of the cut pattern 22 will not be printed by the printer. Abstract cut pattern 32 is the first cut pattern 20 including a single graphic element 26. Abstract cut pattern 34 is the third cut pattern 24 similarly including two iterations of the repeating template graphic 28. Relationships of the graphic pattern relative to the cut pattern are Pos(x,y) Rotation, Scale.

Figure 2:
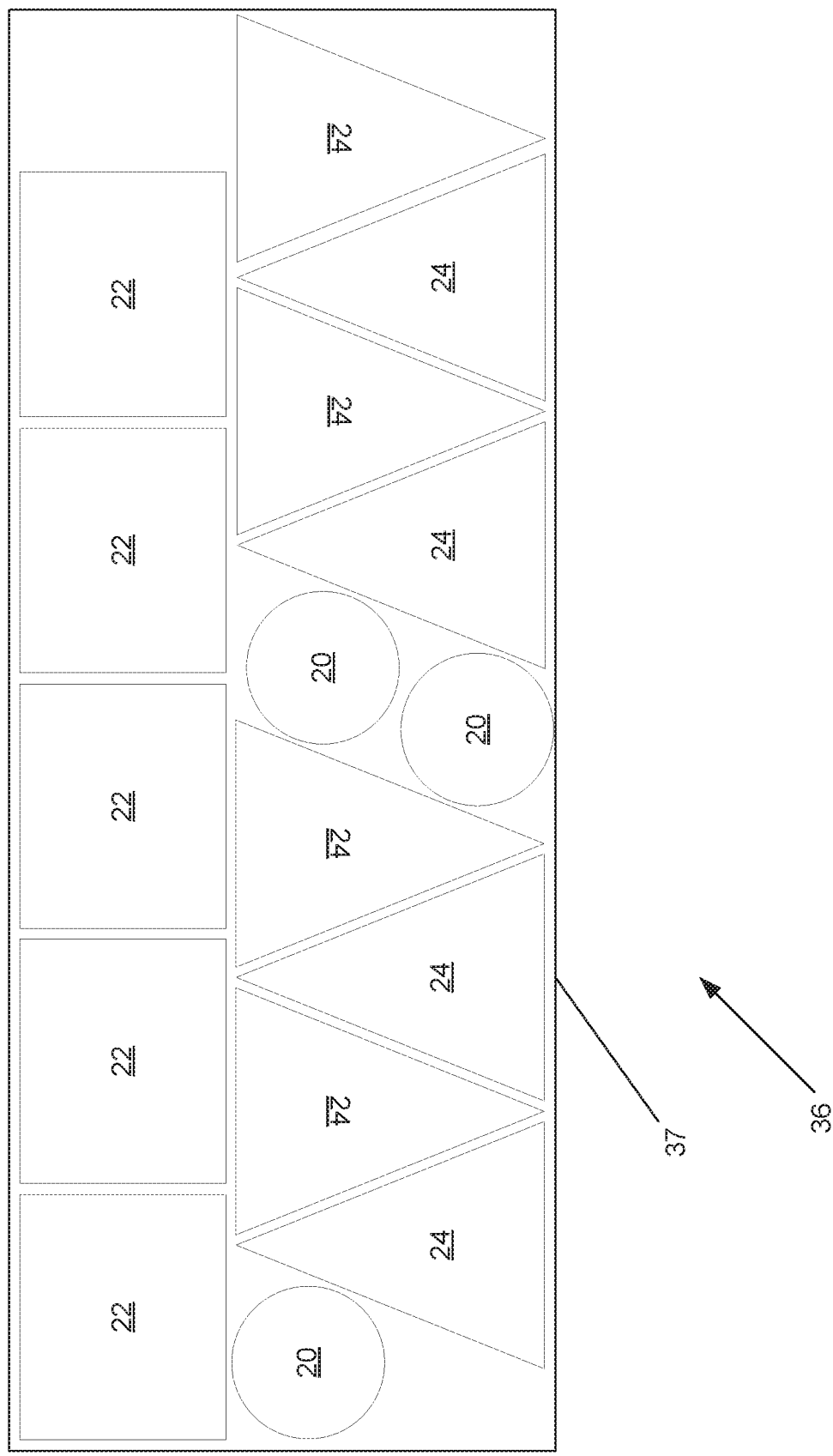
FIG. 2 illustrates a nesting orientation for a number of cut patterns without graphics on virtual fabric.

FIG. 2 illustrates a nesting orientation 36 for a number of cut patterns 20, 22, 24 without graphics on virtual fabric 36. The nesting orientation prioritizes space efficiency by nesting on "white" (no graphics) virtual fabric. Each nested cut pattern 20, 22, 24 carries its own relationships to graphic patterns based on abstract cut patterns that may be implemented across the nesting orientation 36.

Figure 3:
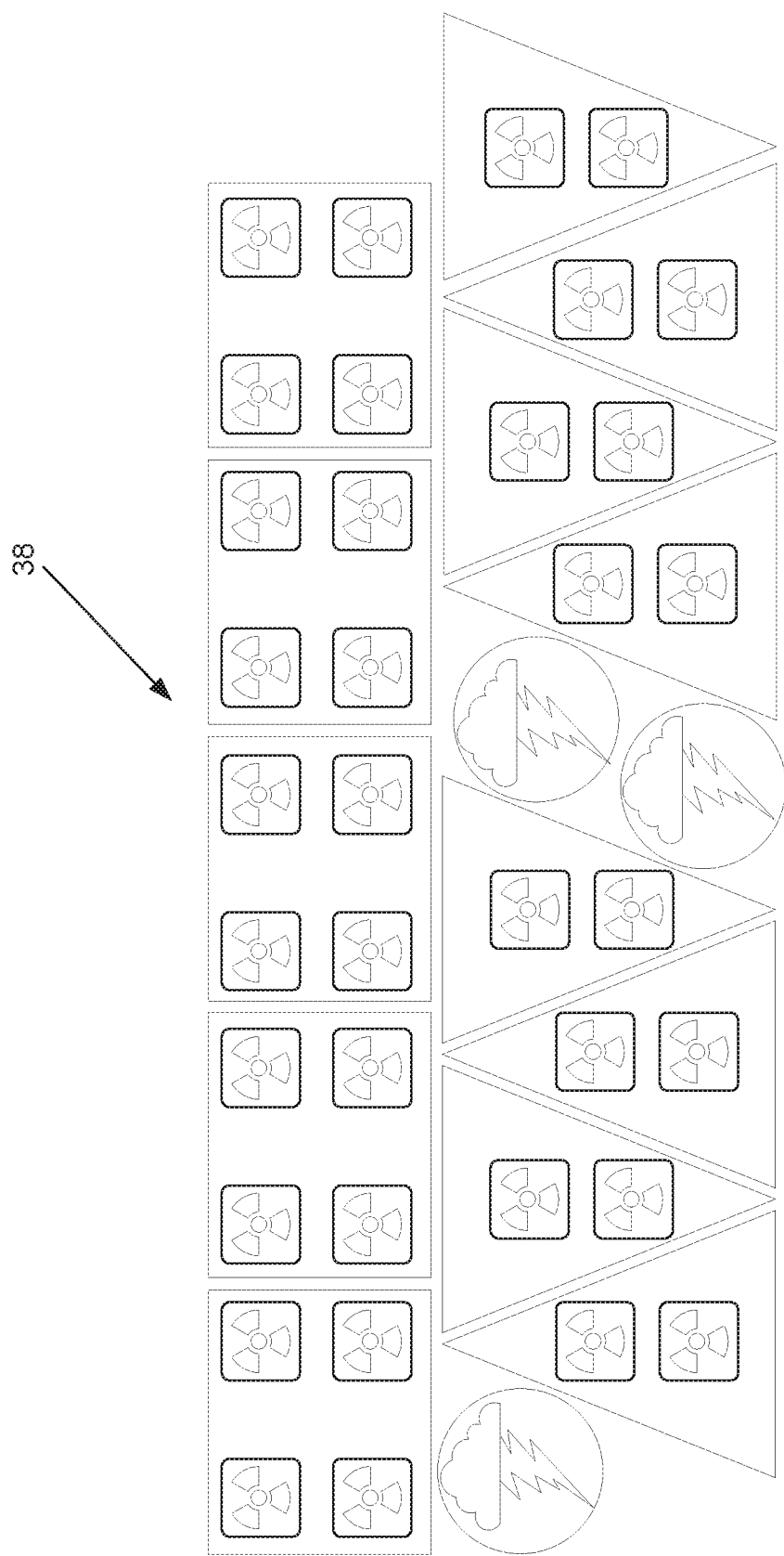
FIG. 3 illustrates a layout presentation where each cut pattern carries a respective orientational relationship to graphic patterns.

FIG. 3 illustrates a layout presentation where each cut pattern carries a respective orientational relationship to graphic patterns. Displayed is at least a portion of a set of print instructions to print on a physical fabric sheet. The print instructions include implemented abstract cut patterns across each of the nested cut patterns 20, 22, 24. Despite the orientation of the cut pattern, the graphics are oriented in the print instructions 38 according to the nesting orientation of the individual cut patterns 20, 22, 24.

Figure 4:
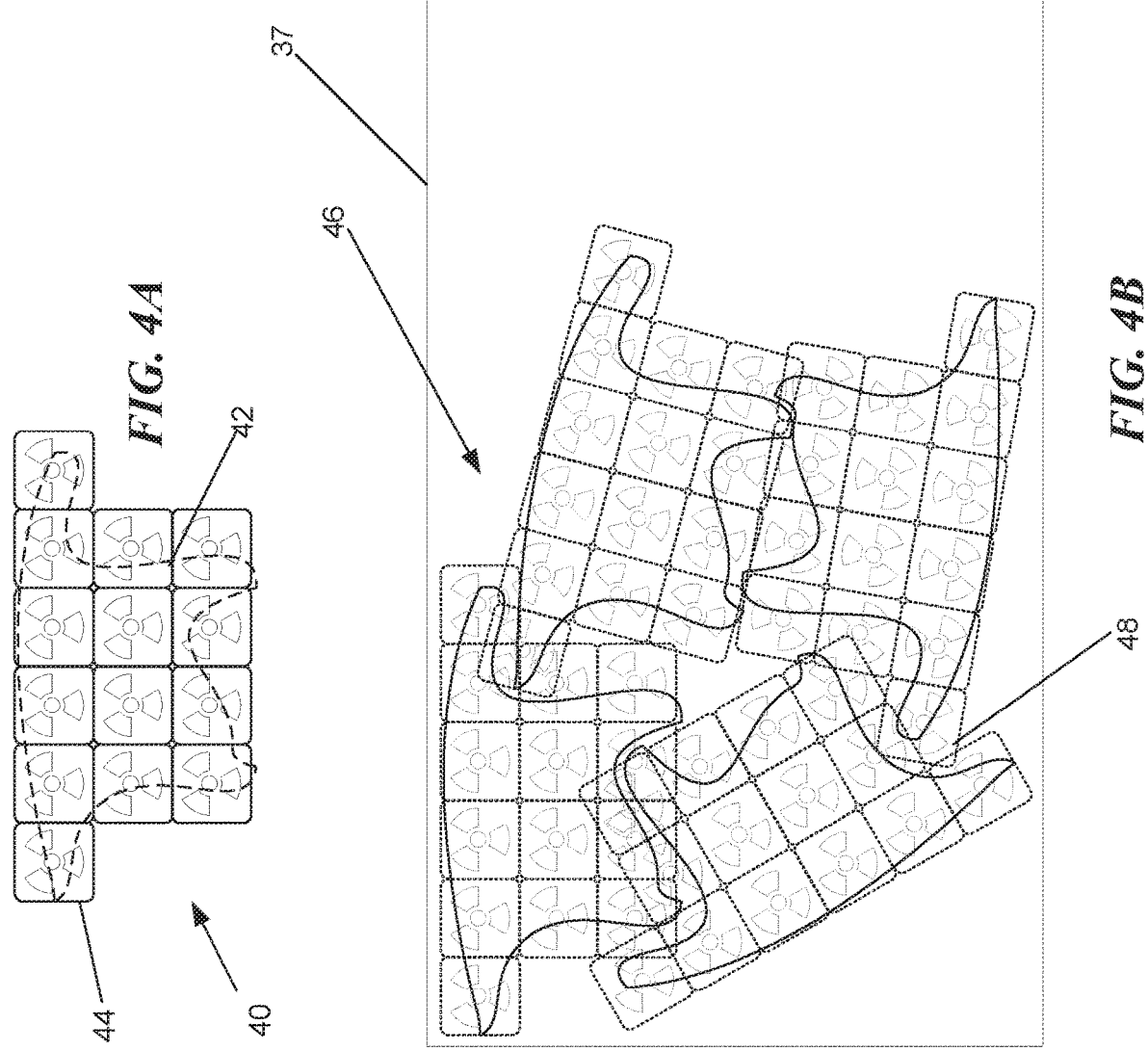
FIG. 4A illustrates a set of graphics oriented to an arbitrary cut pattern.
FIG. 4B illustrates a nesting of cut patterns on virtual fabric including graphics oriented according to the nesting pattern.

FIG. 4A illustrates an abstract repeating cut pattern 40 including a set of graphics oriented to an arbitrary cut pattern 42. The dashed line illustrates the positioning of the arbitrary cut pattern 42, while solid lines indicate placement of single element graphics aligned ("aligned graphics 44") across the abstract cut pattern 42. The aligned graphics 44 are positioned to extend beyond the edges of the abstract cut pattern 42 in order to replicate the effect of use of fabric that has a single repeating pattern. When nested, the aligned graphics 44 enable more efficient use of the physical fabric.

FIG. 4B illustrates a nesting of abstract repeating cut patterns 46 on virtual fabric 37 including graphics oriented according to the nesting pattern 46. For each cut pattern, the nesting orientation 46 improves space efficiency. A nesting layout is defined and sent to the DFE/RIP/Printer. In this example, the system ignores fabric structure as a guide to nesting orientation. The nesting orientation 46 ignores the aligned graphics 44 that extend beyond the edges of the cut patterns 42. Thus, overlapping graphic regions 48 have no effect on the resultant print job. In doing so, the print instructions can replicate a circumstance where the resultant cut patterns appear as if they had been cut from fabric that initially included a repeating pattern, while still reducing the amount of scrap material generated by a poor nesting efficiency. Generating fabric textiles in the described manner improves materials efficiency.

Figure 5:
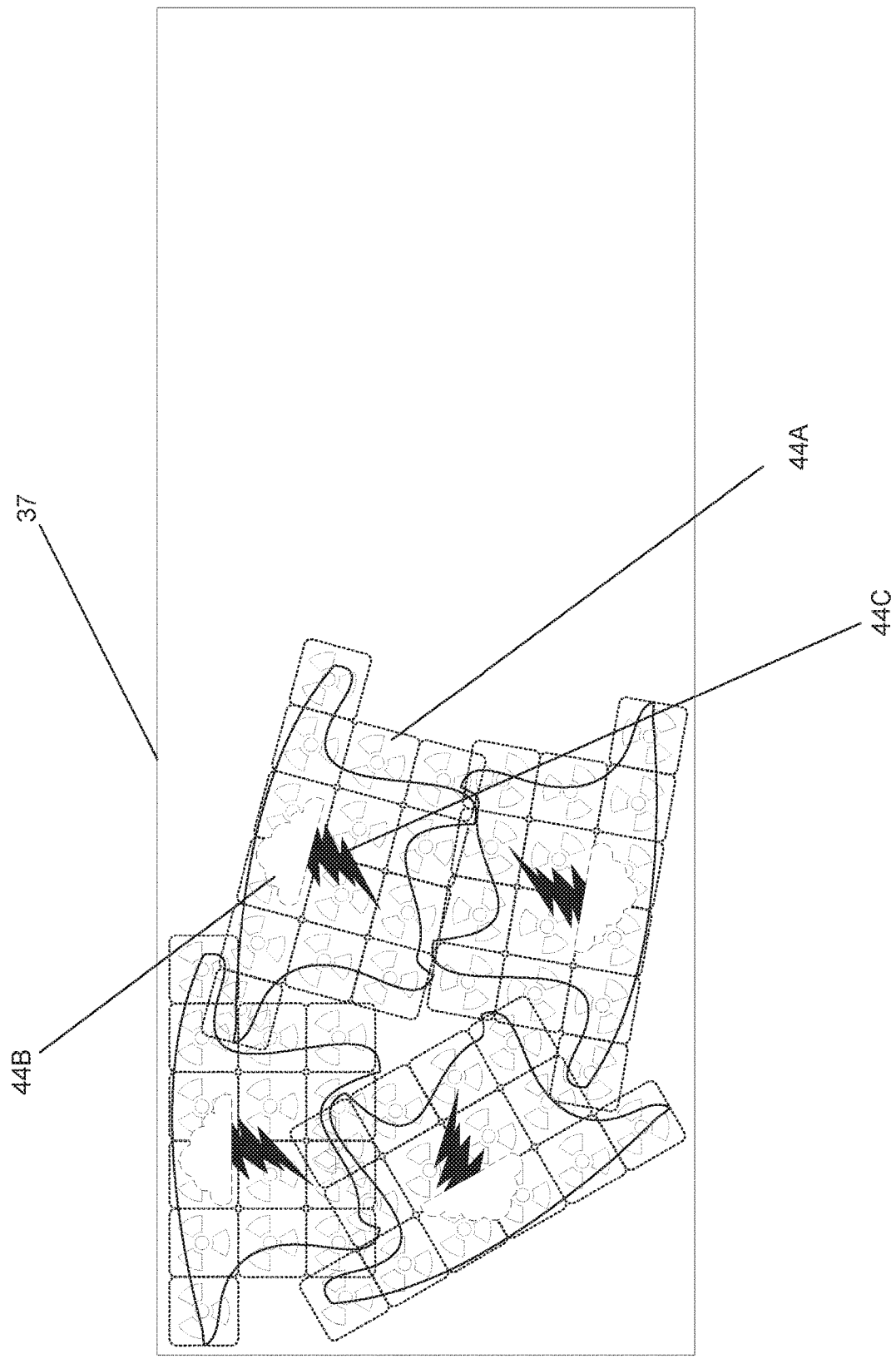
FIG. 5 illustrates a nesting of cut patterns on virtual fabric including multiple layers of graphics oriented according to the nesting pattern.

FIG. 5 illustrates a nesting of cut patterns on virtual fabric including multiple layers of graphics oriented according to the nesting pattern. In some embodiments of printers, the printer is able to distinguish multiple (e.g., 3) layers of graphics. For example, three layers may include a background layer 44A, a body layer 44B, and a foreground layer 44C. The "body," or the middle layer enables positioning of a graphic shape description as a "clip path" and the graphic contentment of the "clip path" is repeatable.

The layered output is described as a function where

Output=*f*(FG, Body, BG);

BG (background) is the first layer of materials, which may be ink or another chemistry. The background can be a uniform layer or a repeatable patterned layer. An example of a method to produce the background layer can be via Rotary printing, high discharge CU inkjets, DOD inkjets or other known methods. Ink may be used for dyeing, coloring or producing graphic effects and other chemistries may be used for special treatment and characteristics of the fabric.

FG (foreground) is the top or last layer of material and inks. The foreground can be a uniform layer or a repeatable patented layer. An example of a method to produce the foreground layer can be via Rotary printing, high discharge CIJ inkjets, DOD inkjets or other known method. Ink may be used for dyeing, coloring or producing graphic effects and other chemistries may be used for special treatment and characteristics of the fabric.

Body is the layer where the most prominent graphic artwork is being printed. In some embodiments, the printing device is comprised of 4 to 12 printing bars where each bar may deliver a unique color across the full width of the fabric in a controlled manner, which enables the creation of unlimited variation of colors and graphic shapes. This part is a common manifestation of the "single pass" inkjet printing device for the textile industry. Though a single pass printer is referenced here, other types of printers may be used including scanning-based printers with a moving carriage. The body represents the capability to print Variable Data, that is, cover the fabric with different graphic shapes per rules or manufacturing considerations. The Graphic description of the laid down image can be described as:

Body=*f*(masks, Clip-Path, TM)

Clip-Path is a closed vector line or shape that can describe any design of a physical object used to cut out a 2D image. Anything inside the path is included after the clipping path is applied; anything outside the path will be omitted from the output. Applying the clipping path results in a hard line or, alternatively, can be "smoothed" by overprinting or antialiasing application. In the case of fabric design, the clip-path may represent garment/textile parts, for example, sleeves, front, back, and so on, originated from the technical pack objects by utilizing CAD systems, for example, the application may be by EFI Optitex. The "Clip-Path" is positioned relative to the width of the not-yet-decorated fabric and relative to the number of such parts needed.

The considerations in positioning the shapes is to prioritize utilization of fabric, that is, as densely as possible but considering fabric characteristics like elasticity and other sources of deformations, fabric construction, and directions of the fibers (yarns). Other manufacturing processes like cutting, sewing, physical properties of the chosen fabric, and orientation of the fabric may be considered in positioning the clip-paths relative to the fabric.

When deriving the cut patterns, the limitation of accuracy of the cutting machines can also be taken into consideration when piling multiple "sheets of fabric."

Figure 6:
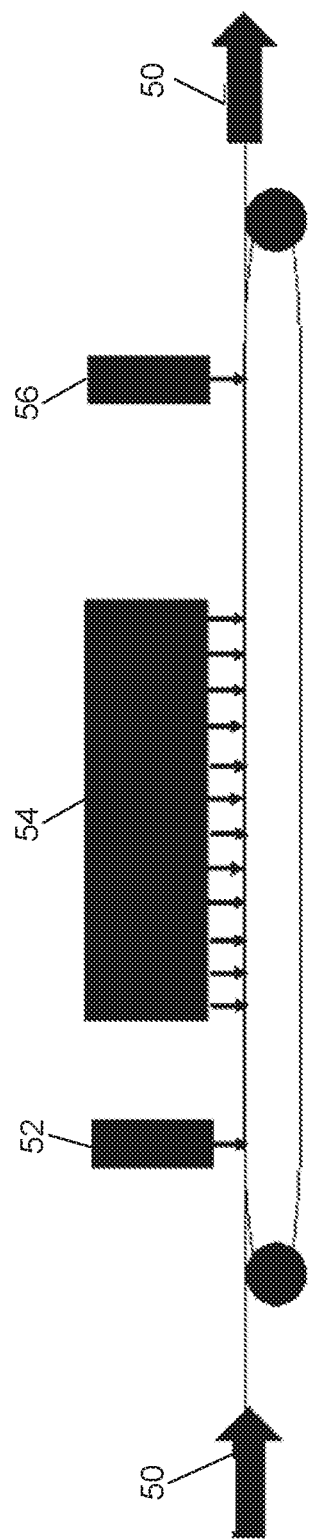
FIG. 6 illustrates an exemplary press for fabric printing.

FIG. 6 illustrates an exemplary process for fabric printing. Element 50 illustrates the direction of the printing press. Element 52 is a background layer applicator. Element 54 is the printing mechanism for the body layer. The body layer printing mechanism includes the largest number of inks (e.g., 12 inks). Element 56 is a foreground layer applicator.

Figure 7:
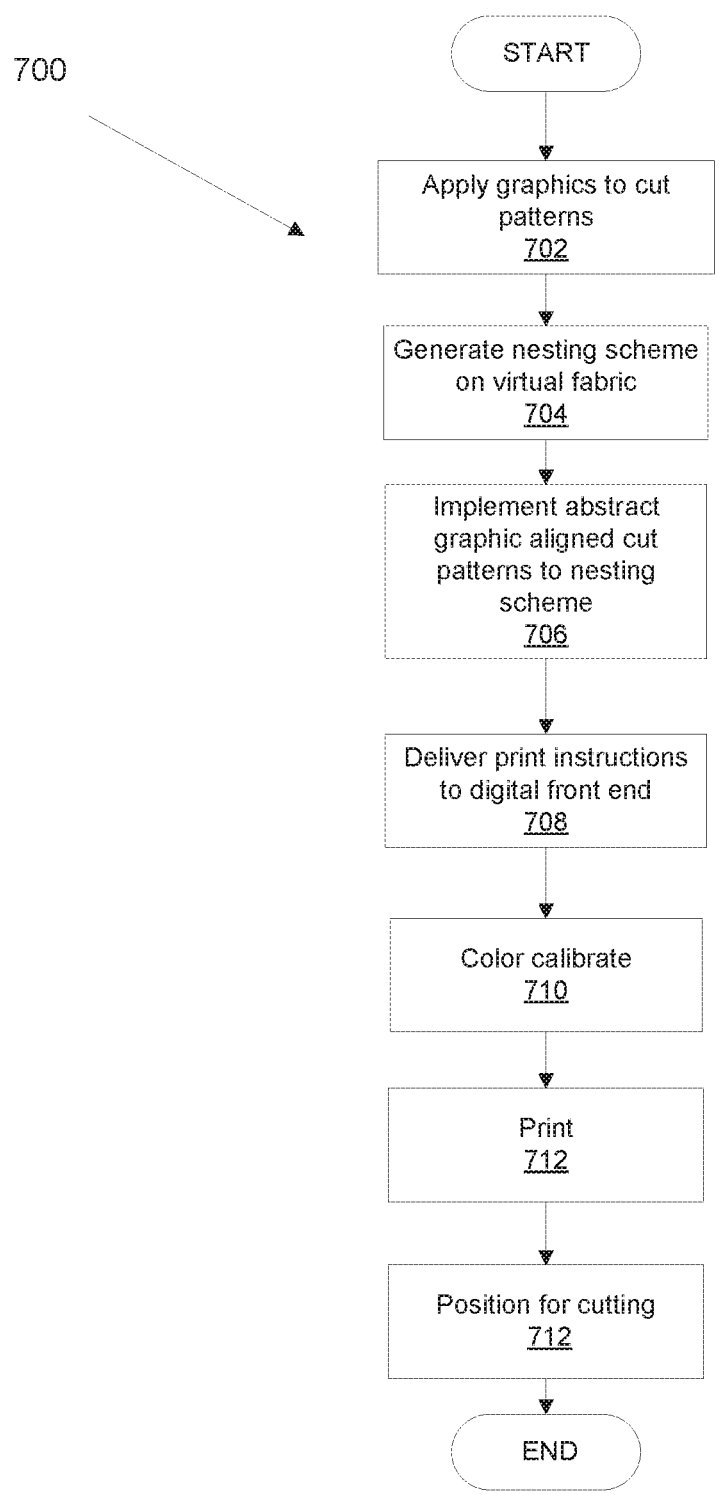
FIG. 7 is a flowchart that illustrates a process for generating textile print instructions.

FIG. 7 is a flowchart that illustrates a process for generating textile print instructions. Those of ordinary skill in the art appreciate that the method of creating the optimized nesting involves a number of the following elements. A first element is Pattern Design—the creation of the garment parts intended to be sewn together to create the final product. A second element is graphic/print design—the definition of the imaging and graphics/colors that appear on the garment. The design may be based on a repeated pattern and multiple colorways or layers. A third element is marker making or nesting—a process of positioning the parts (the parts cuts design) of the resulted printed fabric at the right position to reflect the designer-intended objective of appearance, including the way the parts are sewn together in a way that the designs are matched together across parts.

The pattern design system also creates the detailed print design in high quality for each geometry and can store the print design and output it for both nesting and direct printing. To accomplish this objective, the base print pattern is combined with the part geometry at the right place to match the other parts' geometries.

In step 702, a computer/human interface applies graphics to the cut segments as desired. The computer interface enables placing, moving, scaling, and rotating the basic graphic patterns manually or automatically. The graphics are applied to an "abstract" cut segment. The cut segment is "abstract" in that it is not representative of any specific instance of the given cut segment placed on a specific position on fabric or virtual fabric. The abstract cut segment including applied graphics is operated on in later steps.

The user interface allows for applied graphics to overlap boundaries of the given cut segment. In a preferred embodiment, the placement of cut segments per rules of harmonizing the appearance of design elements may flow from one geometric part to the other. In some embodiments, multiple layers of graphics are applied to a given cut segment style.

In step 704, the nesting system uses the geometries generated by the various cut segments and arranges them efficiently per the required volume and variety of sizes on a fabric sheet with specific dimensions. In some embodiments, the ratio of cut segments is included in the nesting. Taking advantage of the digital print system allows printing of any image in any shape on a gray or dyed fabric.

Once efficient arrangement is achieved, via automated nesting and/or manual manipulation of the geometric patterns, in step 706, the specific print graphic design is added via implementation of the abstract cut segments (including graphics) into the positions generated by the nesting scheme. The graphics appear on each cut pattern geometry in the arrangement, adhering to the geometry specific orientation and location on the virtual fabric sheet. Pattern geometries are rotated and moved around in the arrangement process. The print instructions thus include a set of cut segments arranged on a virtual fabric sheet with graphics applied and oriented relative to the orientation of the various cut segments.

In step 708, the resulting print instructions are sent to the digital printing process. In some embodiments, the print instructions are embodied as a single image representing the entire arrangement constructing the total count of the needed pieces for each colorway. The system can be also configured so that the collection of pieces, represented as graphic files with the graphics and the shape descriptions, are sent to the DFE driving the digital press, and the nesting is done by the DFE either as a batch process or on the fly while printing.

When a single composed image is sent, this image includes only the print elements inside the patterns geometries and not the geometries themselves in their final position on the print area. In case the collection of patterns to be nested by the DFE is sent to the printer, the geometry (Clip-Path) is sent as well. Additionally, a standard cutting file is generated (cutting instructions or marker file) to be used in the cutting process.

In step 710, the system performs exact color matching calibration, RIP, and is directed to the final printing phase. In step 712, an industrial printer prints the entire arrangement as a single big image on the textile sheet. Reference marks are printed as well to indicate bias location of the fabric sheet for later use when placing on the cutting table. In some embodiments, graphics that extend beyond the edges of the cut segments may be omitted from the printing process. In some embodiments, graphics are printed a cutting threshold distance beyond the edges of the cut segment to account for cutting error.

Following the printing, in step 714, the fabric sheet is placed and positioned, using the reference marks, on a standard cutting table and, using the cutting file created, a cutting process take place. The result of the cutting process includes cutting the fabric into the design patterns already including their prints as created in the print phase.

Exemplary embodiments herein combine an Optitex PDS system for pattern design, an Optitex Marker system for nesting, an EFI Fiery for color matching and RIP, and an EFI Textile printer for direct printing the required textures on the nested patterns.

Printing Process

In an exemplary embodiment, a PDF, PS, or any other graphic language describes the execution script with the following pseudo commands describing the layout:

```
Graphic design basic repeat block
W,H
Graphic elements (images, text, lines, shapes...)
Cut pattern descriptions
Cut pattern 1:
Graphic description of the shape
Description of the relationship to the graphic basic
repeat
Cut pattern 2:
....
Bounding box of the nested repeat: X,Y, Width, Height
(relative to the fabric)
Repeats: (across the width of the fabric)
Length (how many meters to print, which represent also
the repeats in the height direction):
For the bounding box add:
Cut pattern 1: X,Y, relative to the bounding box
Cut pattern 2: ....
....
```

This print description language file is sent to the DFE/RIP for processing and generation of the print data sent to the printing press.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, mean any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel or may be performed at different times. Further, any specific numbers noted herein are only examples: alternative implementations may employ differing values or ranges. It will be appreciated that any dimensions given herein are only exemplary and that none of the dimensions or descriptions are limiting on the present invention.

The teachings of the disclosure provided herein can be applied to other systems, not necessarily the system described above. The elements and acts of the various embodiments described above can be combined to provide further embodiments.

Any patents, applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for"). Accordingly, the applicant reserves the right to add additional claims after filing the application to pursue such additional claim forms for other aspects of the disclosure.

Accordingly, although exemplary embodiments have been shown and described, it is to be understood that all the terms used herein are descriptive rather than limiting, and that many changes, modifications, and substitutions may be made by one having ordinary skill in the art without departing from the spirit and scope of the invention.

The invention claimed is:

1. A method comprising:
generating a set of print instructions including a nesting orientation of a plurality of pattern components of a textile product on a virtual sheet of fabric, wherein the nesting orientation is a diverse configuration including multiple types of differently shaped pattern components of the plurality of pattern components interspersed amongst one another prioritizing density subject to physical fabric characteristics;
modifying the print instructions to implement a plurality of print patterns into positions generated by the nesting orientation of the nested pattern components, each nested pattern component in the nesting orientation carries individualized relationships to print patterns based on abstract cut patterns that are implemented across the nesting orientation, wherein print instructions thus implement a set of nested pattern components arranged on the virtual sheet of fabric with print patterns applied and oriented relative to the orientation of the various nested pattern components; and
printing on a fabric the plurality of print patterns according to said generating and modifying.

2. The method of claim 1, wherein the pattern components are at least two of:
all or part of a top garment
all or part of a pants or shorts garment;
all or part of a dress garment;
all or part of a hat garment;
all or part of a body suit garment; or
all or part of bag garment.

3. The method of claim 1, wherein the plurality of print patterns overlap within the print instructions, and the print instructions include cut markings.

4. The method of claim 1, wherein the plurality of print patterns includes multiple layers, and said printing further comprises:
performing a single pass application of the plurality of print patterns.

5. The method of claim 4, wherein the single pass application of the plurality of print patterns includes a background layer a body layer and a foreground layer.

6. The method of claim 1, further comprising:
generating an alternate homogeneous nesting configuration, wherein each of the multiple types of differently shaped pattern components are positioned like-with-like as opposed distinct from the diverse configuration;
comparing a packing efficiency of the diverse configuration and the alternate homogeneous nesting configuration.

7. The method of claim 1, further comprising:
positioning the nesting orientation of pattern components in repeated iterations on a digital 2-D surface representing a physical textile.

8. The method of claim 1, wherein said modifying further includes:
rotating the plurality of print patterns according to the determined packing scheme.

9. A system comprising:
a processor;

a memory including instructions that when executed cause the processor to:

generating a set of print instructions including a nesting orientation of a plurality of pattern components of a textile product on a 2D space corresponding to a sheet of fabric, wherein the nesting orientation is a diverse configuration including multiple types of differently shaped pattern components of the plurality of pattern components interspersed amongst one another prioritizing density subject to physical fabric characteristics;

modifying the print instructions to include a plurality of print patterns corresponding to the nested pattern components, each nested pattern component in the nesting orientation carries individualized relationships to print patterns based on abstract cut patterns that are implemented across the nesting orientation, wherein the plurality of print patterns are oriented according to said nesting orientation; and printing on the fabric the plurality of print patterns according to said generating and modifying.

10. The system of claim 9, wherein the pattern components are at least two of:
all or part of a top garment
all or part of a pants or shorts garment;
all or part of a dress garment;
all or part of a hat garment;
all or part of a body suit garment; or
all or part of bag garment.

11. The system of claim 9, wherein the plurality of print patterns overlap within the print instructions, and the print instructions include cut markings.

12. The system of claim 9, wherein the plurality of print patterns includes multiple layers, and the printer is further configured to perform a single pass application of the plurality of print patterns.

13. The system of claim 12, wherein the single pass application of the plurality of print patterns includes a background layer a body layer and a foreground layer.

14. A computer-readable storage medium storing instructions that, when executed by a computing system, cause the computing system to perform a process comprising:

generating a set of print instructions including a nesting orientation of a plurality of pattern components of a textile product on a 2D space corresponding to a sheet of fabric, wherein the nesting orientation is a diverse configuration including multiple types of differently shaped pattern components of the plurality of pattern components interspersed amongst one another prioritizing density subject to physical fabric characteristics;

modifying the print instructions to include a plurality of print patterns corresponding to the nested pattern components, each nested pattern component in the nesting orientation carries individualized relationships to print patterns based on abstract cut patterns that are implemented across the nesting orientation, wherein the plurality of print patterns are oriented according to said nesting orientation; and printing on the fabric the plurality of print patterns according to said generating and modifying.

15. The computer-readable storage medium of claim 14, wherein the process further comprising:

generating an alternate homogeneous nesting configuration, wherein each of the multiple types of differently shaped pattern components are positioned like-with-like as opposed distinct from the diverse configuration; and comparing a packing efficiency of the diverse configuration and the alternate homogeneous nesting configuration.

16. The computer-readable storage medium of claim 14, the process further comprising:

positioning the nesting orientation of pattern components in repeated iterations on a digital 2-D surface representing a physical textile.

17. The computer-readable storage medium of claim 14, wherein said modifying further includes:

rotating the plurality of print patterns according to the determined packing scheme.

18. The computer-readable storage medium of claim 14, wherein the plurality of print patterns includes multiple layers, and said transmitted printing instructions further comprise:

performing a single pass application of the plurality of print patterns.

* * * * *